United States Patent
Bajorat

(10) Patent No.: US 9,145,114 B2
(45) Date of Patent: Sep. 29, 2015

(54) METHOD FOR ENSURING A BRAKING EFFECT

(71) Applicant: Torsten Bajorat, Villmar (DE)

(72) Inventor: Torsten Bajorat, Villmar (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 13/939,776

(22) Filed: Jul. 11, 2013

(65) Prior Publication Data

US 2015/0019101 A1    Jan. 15, 2015

(30) Foreign Application Priority Data

Jul. 13, 2012  (DE) .................. 10 2012 212 329

(51) Int. Cl.
| B60W 10/06 | (2006.01) |
| B60T 7/04 | (2006.01) |
| B60T 8/1763 | (2006.01) |
| B60T 7/22 | (2006.01) |
| B60T 13/66 | (2006.01) |

(52) U.S. Cl.
CPC . B60T 7/042 (2013.01); B60T 7/22 (2013.01); B60T 8/17636 (2013.01); B60T 13/662 (2013.01); B60T 2201/03 (2013.01)

(58) Field of Classification Search
CPC ......... B60T 8/24; B60T 13/04; B60T 13/662; B60T 7/12; B60T 7/18; B60T 7/122; B60T 7/14; B60T 7/107; B60T 13/741; B60T 8/17616; B60T 7/042; B60T 8/321; B60K 41/004; B60W 10/06
USPC ............ 477/185, 195; 303/156, 162, 89, 191; 701/71, 70
See application file for complete search history.

(56) References Cited

U.S. PATENT DOCUMENTS

| 4,919,494 | A | * | 4/1990 | Higashimata et al. ........ 303/156 |
| 5,139,315 | A | * | 8/1992 | Walenty et al. ............... 303/162 |
| 6,256,570 | B1 | * | 7/2001 | Weiberle et al. ................ 701/70 |
| 6,416,441 | B1 | * | 7/2002 | Eckert et al. .................. 477/185 |
| 2005/0029864 | A1 | * | 2/2005 | Bauer et al. ................... 303/191 |
| 2006/0273656 | A1 | * | 12/2006 | Sherman et al. ................ 303/89 |
| 2008/0294319 | A1 | * | 11/2008 | Baijens et al. .................. 701/70 |
| 2011/0039658 | A1 | * | 2/2011 | Sokoll .......................... 477/195 |

FOREIGN PATENT DOCUMENTS

| DE | 100 33 835 A1 | 1/2002 |
| DE | 101 46 770 A1 | 4/2003 |
| EP | 0 741 066 A1 | 11/1996 |
| EP | 1 745 999 A2 | 1/2007 |
| EP | 2 108 554 A1 | 10/2009 |
| WO | WO 2007/090823 A1 | 8/2007 |

OTHER PUBLICATIONS

German Search Report—Jun. 13, 2013.

* cited by examiner

*Primary Examiner* — Tuan C. To
*Assistant Examiner* — Yuri Kan
(74) *Attorney, Agent, or Firm* — Brinks Gilson & Lione

(57) ABSTRACT

A method for ensuring a braking effect utilizes a service brake system and a parking brake system of a vehicle. The service brake system is configured to be actuated irrespective of a driver input, and the parking brake system is activated by an extraneous force, for example in an electromechanical arrangement. When a deceleration request is received, the service brake system is initially actuated. If a deceleration variable remains below a target value and the measured slip is smaller than a slip threshold value, the parking brake system is actuated in order to bring the vehicle to a standstill.

13 Claims, 2 Drawing Sheets

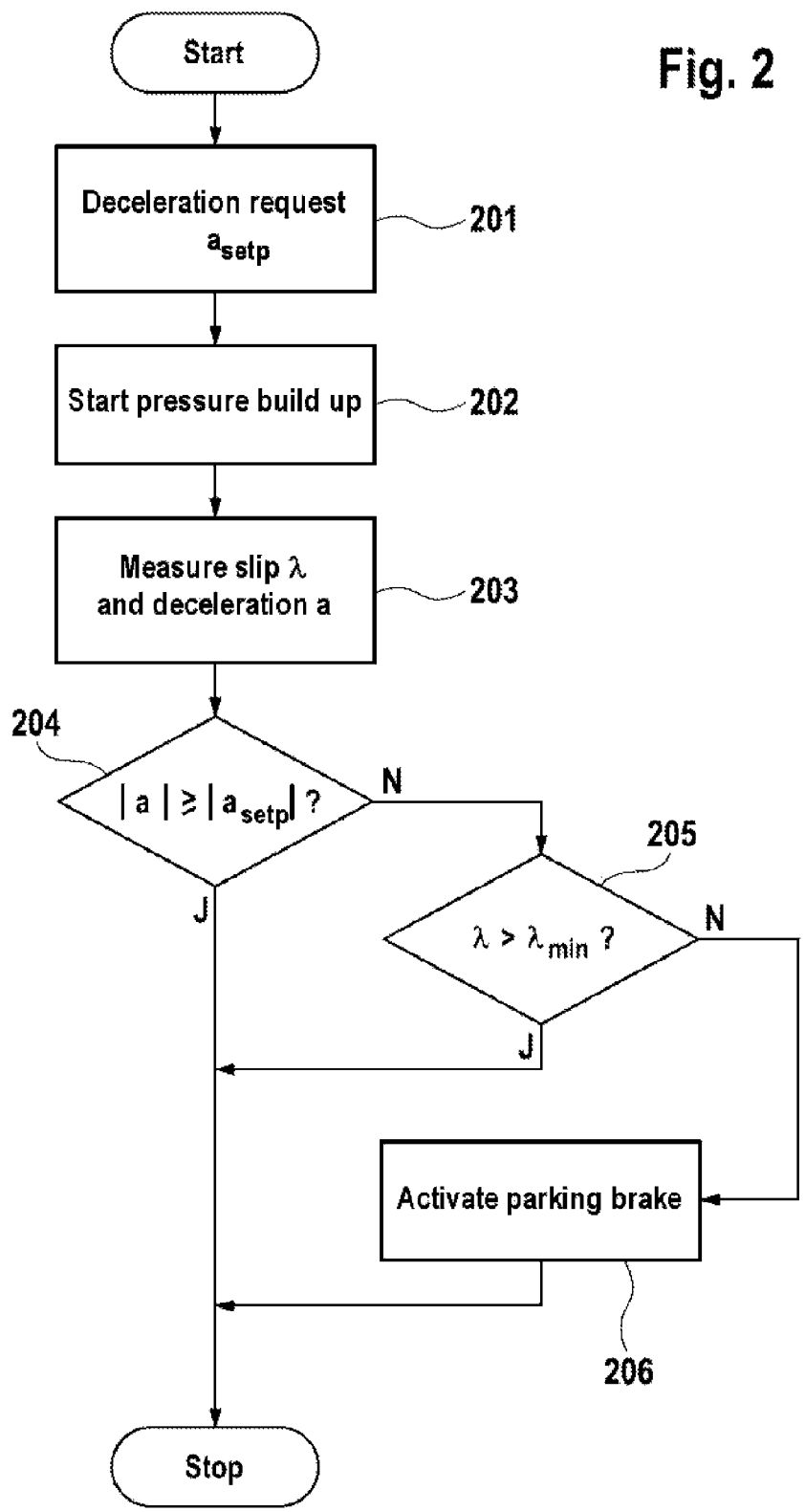

METHOD FOR ENSURING A BRAKING EFFECT

CROSS REFERENCE TO RELATED APPLICATION

This application claims priority to German Patent Application No. 102012212329.6, filed Jul. 13, 2012.

TECHNICAL FIELD OF THE INVENTION

The invention relates to a method for ensuring a braking effect of a brake system with a service brake system at at least one wheel for building up a braking torque independently of a driver, with a parking brake activated by an extraneous force, and with a wheel rotational speed sensor at the at least one wheel associated with the service brake system. The invention further relates to a brake system suitable for carrying out the method.

BACKGROUND OF THE INVENTION

Modern motor vehicles increasingly have an electric parking brake, for example a parking brake actuated by an extraneous electromechanical force, and which can be applied or released by the driver by activating a parking brake pushbutton key. In order to meet the requirements defined in European Standard ECE R13H for passenger car brake systems with respect to fault scenarios and fall back levels, an emergency braking function can be activated by pressing the parking brake pushbutton key, as is known for example, from EP 741 066 B1.

In the previously known method, a pressure generator is provided which acts on a friction brake and as a result initiates an emergency braking operation. In this context, a common activation device (the parking brake pushbutton key) is provided for the emergency braking and parking brake system which makes available an emergency braking function using a logic circuit when the vehicle speed v>0 by actuating the pressure generator, while when v=0, the parking brake is activated. The previously known method therefore provides braking of the driving motor vehicle exclusively via the service brake system, in particular a hydraulic friction brake.

WO 2007/090823 A1 proposes that during the execution of an emergency braking process further measures for reducing the speed of the vehicle are carried out. In this context there is provision for the engine torque of the drive motor to be suppressed and/or for the position of the accelerator pedal to be ignored. This permits the braking distance to be reduced in the case of emergency braking, but also assumes correct functioning of the service brake system.

SUMMARY OF THE INVENTION

The object of the present invention is therefore to make available an emergency braking function which is reliable even in the case of defects in the service brake system, and to ensure sufficient braking effect to bring the vehicle to a standstill.

According to one aspect of the invention, the object is achieved with a method for ensuring a braking effect of a brake system with a service brake system including a wheel brake at least one wheel for building up a braking torque independently of a driver, a parking brake which is activated by an extraneous force at least on e wheel and at least one wheel rotational speed sensor at a wheel which can be braked by the service brake system. The method according to the invention comprises the following steps:

a) building up braking torque via the service brake system in accordance with a deceleration request,
b) determining a deceleration variable of the vehicle,
c) determining a slip variable of at least one wheel,
d) comparing the deceleration variable with a deceleration target value,
e) comparing the determined slip variable with a slip threshold value,
f) determining that the deceleration variable is smaller than the deceleration target value and that the slip variable is smaller than the slip threshold value, and
g) activating the parking brake upon determining that the deceleration variable is smaller than the deceleration target value and that the slip variable is smaller than the slip threshold value.

As a result, even in the case of a leak which cannot be easily detected, such as tearing off of the reservoir container at the master brake cylinder, a minimum braking deceleration or braking effect is reliably ensured. Furthermore, the method according to the invention has the advantage that the parking brake is not activated if, owing to a low coefficient of friction, it is impossible for the braking deceleration to be increased (or if the lack of braking deceleration has not been caused by a defect in the service brake system).

It is advantageous if braking torque is built up when a switch or pushbutton key has been activated, wherein the deceleration request preferably has a constant value. As a result, the driver can reliably trigger emergency braking via a parking brake pushbutton key.

Furthermore, it is advantageous if braking torque is built up when the driver indicates a braking request by activating a brake pedal, when the deceleration request is carried out in accordance with a sensor which senses the activation of the brakes, i.e. a pedal angle sensor or pedal travel sensor or travel sensor on the master brake cylinder. If a suitable sensor is available (for example in a hybrid vehicle), a sufficient braking deceleration can also be made available when the brake pedal is activated by the driver, without the brake pedal being depressed again.

In addition it is advantageous if braking torque is built up when a braking request is received by a further control unit, in particular via a vehicle data bus, wherein the further control unit is preferably connected to at least one surroundings sensor. As a result, a fall back level for braking the vehicle is present, for example for automatic inter-vehicle distance control.

According to one preferred embodiment of the invention, the service brake system comprises hydraulic wheel brakes which are arranged in at least one brake circuit, in particular hydraulic wheel brakes, arranged in two brake circuits, on all the wheels of the vehicle. Here it is expedient if the pressure in at least one brake circuit is measured and evaluated as a deceleration variable.

According to one particularly preferred embodiment of the invention, a motor-pump assembly is arranged in each brake circuit for building up braking torque independently of a driver. The motor-pump assembly can be connected on the pressure side to at least one wheel brake and on the suction side to a pressure medium reservoir, indirectly via a master brake cylinder or directly. The parking brake is activated when a deceleration request is received and a defect has been detected in the service brake system and/or the motor-pump assembly.

Expediently, a vehicle deceleration which is measured with a longitudinal acceleration sensor and/or determined from wheel rotational speed information is evaluated as a deceleration variable. Wheel rotational speed sensors are present in motor vehicles for a braking slip control system or further driving stability control systems.

One or more slip variables is/are preferably determined from the comparison of a vehicle speed, which in particular has been estimated from a plurality of wheel speeds or has been determined via a navigation system, with one or more wheel speeds. Instead of calculating the slip, it is particularly preferably possible also for a direct comparison of the individual wheel rotational speeds to take place.

The invention also relates a brake system for a vehicle, comprising hydraulic wheel brakes at all the wheels, at least one hydraulic motor-pump assembly which can be connected to the wheel brake(s) and has the purpose of building up braking torque independently of a driver, at least one parking brake, activated with extraneous force, at least one wheel, in particular at the wheels of an axle, and an electronic control unit, which receives information of at least one wheel rotational speed sensor which is arranged at a wheel which can be braked with the service brake system, wherein a wheel rotational speed sensor is preferably arranged at each wheel of the vehicle, and one or more electronic control units carry out alone or through cooperation a method according to the invention for ensuring a braking effect.

In addition, the invention relates to the use of a brake system according to the invention in a motor vehicle which is at least temporarily driven by one or more electric motors.

Further preferred embodiments can be found in the following description of an exemplary embodiment with reference to figures.

BRIEF DESCRIPTION OF THE DRAWINGS

The attached drawings are included for solely illustrative purposes and are not intended to limit the scope of the present invention. In the drawings, FIG. 2 shows a flowchart of an exemplary embodiment of the method according to the invention.

DETAILED DESCRIPTION OF THE DRAWINGS

Figure 1:
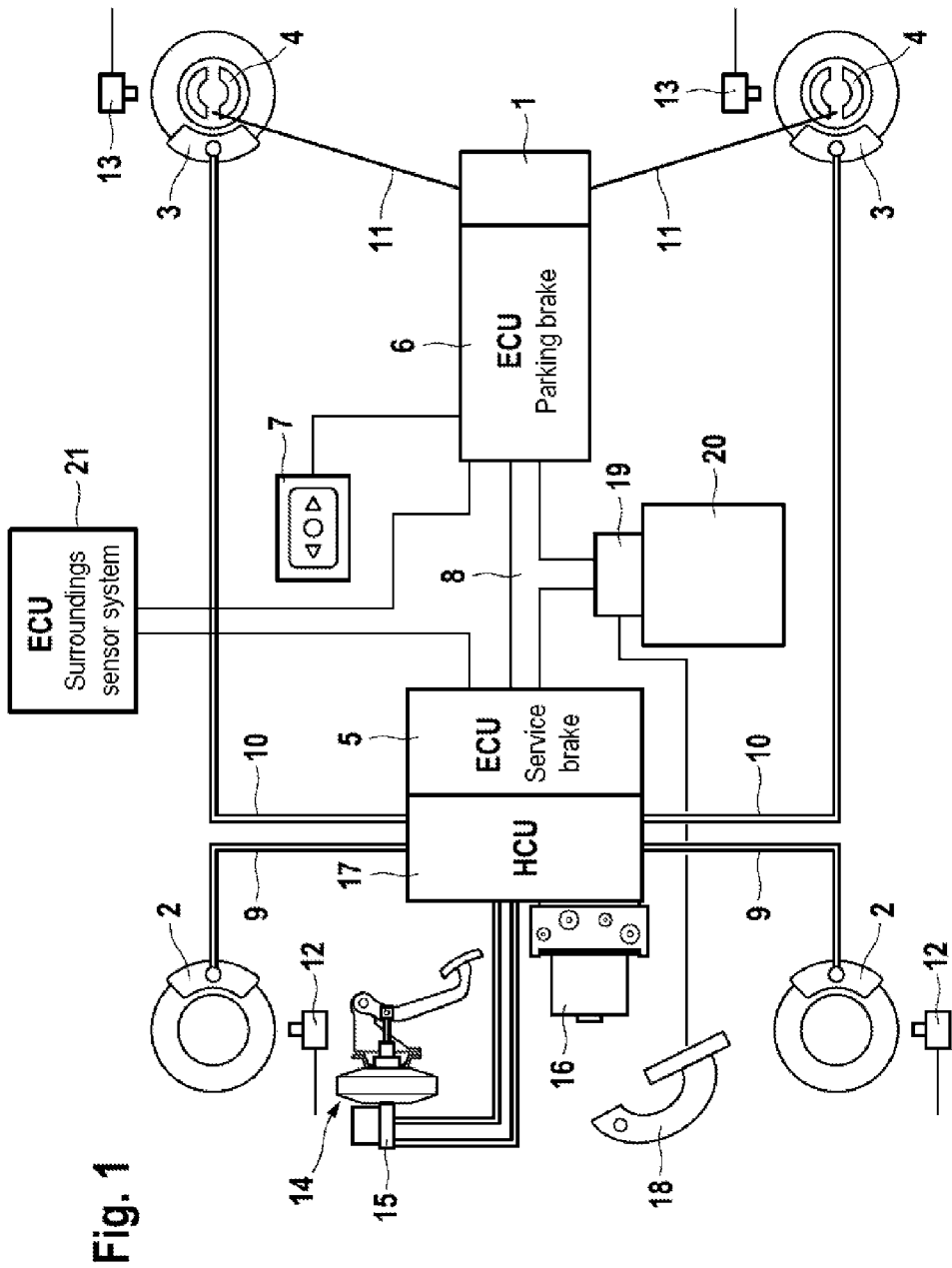
FIG. 1 shows an exemplary brake system with which the method according to the invention can be carried out.

FIG. 1 is a schematic circuit diagram of a brake system which is formed by a service brake system and a parking brake and has wheel brakes 2 on a first axle, in particular the front axle, to which pressure can be applied via a hydraulic line 9 during service braking operations. In order to monitor the desired braking deceleration and to implement a brake slip control as well as to determine the speed of the vehicle, the wheels of the front axle are assigned wheel rotational speed sensors 12 whose output signals are fed to an electronic control unit (ECU) 5 which is assigned to the service brake system. Wheel brakes 3, to which pressure can be applied via a second hydraulic line 10 during service braking operations, are also provided on a second axle, the rear axle. The wheel rotational speeds of the wheels of the rear axle are determined via wheel rotational speed sensors 13 and are fed to the electronic control unit 5 just mentioned.

Furthermore, the wheels of the rear axle also have, in addition to the wheel brakes 3 for service braking operations, a parking brake which can be activated electromechanically via extraneous force. The parking brake of the shown embodiment can be activated electromechanically and comprises two brake devices which can be locked and which are embodied as drum brakes 4, each with an expander lock (not illustrated in more detail). Notably, the extraneous activation of the parking brakes may involve any different mechanism that operates independently of the wheel brakes serving as the service brake system. The expander lock which has just been mentioned can be activated via a cable pole 11 by an electromechanical actuating unit 1, after which the drum brakes 4 are applied. A parking brake process is activated by the vehicle driver via the activation of an operator control element 7. In this context, the output signals of the operator control element 7 are fed to an electronic control unit (ECU) 6 which is assigned to the electromechanical parking brake and which correspondingly actuates the electromechanical actuating unit 1 already mentioned. The electronic control unit 6 just mentioned and the electronic control unit 5 assigned to the service brake system communicate with one another via a data line 8, which is embodied, for example, as a CAN connection.

Furthermore, an engine control unit 19 for the drive engine 20 of the motor vehicle is connected to the data line 8, these being illustrated only schematically in FIG. 1. Furthermore, the output signals of an accelerator pedal 18 are fed to the engine control unit 19. That is to say an acceleration request of the vehicle driver is processed by the accelerator pedal 18 being depressed by the engine control unit 19, and said acceleration request is correspondingly passed onto the drive engine 20.

In order to carry out a service braking operation, the vehicle driver activates a brake booster 14 which is connected to the brake pedal and which is embodied in the present exemplary embodiment as an under pressure brake booster with tandem master cylinder 15 connected downstream. As is apparent from FIG. 1, the pressure which is applied to the tandem master cylinder is fed to a hydraulic control unit (HCU) which is provided with the reference symbol 17. The pressure generator, which can be actuated extraneously, is assigned to the hydraulic control unit 17, said pressure generator being embodied as a hydraulic pump 16 and making available the hydraulic pressure necessary, for example, for carrying out vehicle movement dynamics control or permitting braking torque to be built up independently of the driver.

As already mentioned, a parking brake process is initiated if the vehicle driver activates the operator control element 7 in the stationary state of the motor vehicle. The output signal is fed to the control unit 6 of the parking brake, which control unit 6 correspondingly actuates the electromechanical actuating unit to generate a brake application force. However, it is also possible to carry out an emergency braking function with the aid of the operator control element 7: if the operator control element 7 of the parking brake is activated while the motor vehicle is travelling, this leads to hydraulic braking via the service brake system. The control unit 6 of the parking brake passes on the deceleration request to the control unit 5 of the service brake system, which in turn actuates the hydraulic pump 16 to generate a hydraulic pressure in the wheel brakes 2, 3. In other words, during the activation of the operator control element 7 the electromechanical actuating unit 1 is only actuated to generate a brake application force if the motor vehicle is stationary and, otherwise, the pressure generator 16 of the service brake system is actuated to carry out an emergency braking operation.

Furthermore, FIG. 1 illustrates an electronic control unit (ECU) 21 which is connected to one or more surroundings sensors (not shown). The control unit 21 is connected via a data line to the electronic control unit 5 of the service brake system and can make available functions such as automatic adjustment of the distance from a vehicle travelling ahead. If this distance is smaller than a predefined threshold value, a deceleration request is passed on to the control unit 5 and implemented by the service brake system by actuating the hydraulic pump 16.

FIG. 2 shows an exemplary embodiment of the method according to the invention.

In step 201, a deceleration request $a_{setp}$ is received. For the method according to the invention it is irrelevant whether the deceleration has been requested by the driver via an operator control element, such as the parking brake pushbutton key or a brake pedal which is equipped with a pedal angle sensor, or whether the deceleration request originates from the electronic control unit of the surroundings sensor system. If the deceleration has been requested by the electronic control unit of the surroundings sensor system, it is expedient also to pass on this deceleration request to the control unit of the parking brake via a data line or a vehicle data bus. Correspondingly it is advantageous if the electronic control unit of the service brake system passes on incoming sensor information such as, for example, the pressure prevailing in the master brake cylinder or the information from the wheel rotational speed sensors via a data line or a vehicle data bus, with the result that the method according to the invention can be at least partially carried out in the control unit of the parking brake.

According to the deceleration request, in step 202 a braking torque is built up by the service brake system in that the electronic control unit of the service brake system activates the hydraulic pump and operates, for example, until a pressure which is dependent on the deceleration request is achieved.

After a predefined time period, in step 203 a measurement of the slip of the individual wheels and of the vehicle deceleration achieved or a deceleration variable dependent thereon is carried out by, for example, suitably evaluating the information from the wheel rotational speed sensors. Instead of calculating the slip, it is also possible to carry out a direct comparison of the individual wheel rotational speeds. The vehicle deceleration can alternatively also be determined from the information of a longitudinal acceleration sensor. The pressure in the tandem master brake cylinder or a wheel brake can also be evaluated as a deceleration variable as long as no brake slip control or vehicle movement dynamics control during which the wheel brakes are disconnected from the master brake cylinder takes place.

In step 204, the deceleration variable is compared with a deceleration target value. If, for example, the requested pressure is not achieved despite operation of the hydraulic pump, this can indicate a leak.

On the other hand, it is, however, also possible that the underlying surface has a low coefficient of friction (such as, for example, ice) and therefore a large brake slip already occurs in the case of a lower deceleration, and therefore a brake slip control intervenes. Therefore, in step 205 the measured slip $\lambda$ at one or more wheels is compared with a predefined slip threshold value $\lambda_{min}$. The slip threshold value may be chosen to represent an upper limit at which a further deceleration can be effected by braking the wheels without causing the wheels to lock and may be a fixed value or may vary in different situations, for example in dependence of the current vehicle speed.

If the measured slip does not exceed the slip threshold value, that is to say there is no propensity of the wheels to lock caused by a low coefficient of friction, in step 206 the parking brake is activated in order to ensure sufficient braking deceleration.

According to one preferred embodiment of the invention, during the braking the brake slip continues to be monitored by the parking brake, with the result that a brake slip control also continues to be expediently available.

In principle, the method according to the invention can also be used in service braking operations which are carried out entirely or partially electromechanically in order to ensure a sufficient braking effect even in the case of defects of the service brake system which are difficult to detect.

In the context of the foregoing description, the term "control" encompasses closed-loop control processes or open-loop control processes, or both where appropriate.

The method according to the invention provides the advantage that no incorrect activation of the parking brake takes place if the braking deceleration is smaller than the deceleration target value because of a low coefficient of friction (and not due to a defect of the brake system).

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for ensuring a braking effect of a brake system having a service brake system for building up a braking torque independently of a driver for at least one wheel, a parking brake for at least one wheel which is activated independently of the service brake system via an electromechanical actuating unit, and at least one wheel rotational speed sensor at a wheel associated with the service brake system, the method comprising the following steps:
   a) receiving a deceleration request at an electronic control unit of the brake system and, in response thereto, building up braking torque via the service brake system in accordance with the deceleration request and determining a deceleration target value,
   b) determining a deceleration variable of the vehicle,
   c) determining a slip variable of at least one wheel,
   d) comparing the determined deceleration variable with the deceleration target value,
   e) comparing the determined slip variable with a slip threshold value,
   f) determining that the deceleration variable is smaller than the deceleration target value, and
   g) in response to determining that the deceleration variable is smaller than the deceleration target value, activating the parking brake only when the slip variable is smaller than the slip threshold value.

2. The method according to claim 1, further comprising that the braking torque is built up when a switch or pushbutton key has been activated.

3. The method according to claim 2, wherein the deceleration request has a constant value.

4. The method according to claim 1, further comprising that the braking torque is built up when the driver indicates a braking request by activating a brake pedal, when the deceleration request is carried out in accordance with a sensor which senses an activation of the brakes by the driver.

5. The method according to claim 4, wherein the sensor sensing the activation of the brakes is one of a pedal angle sensor, a pedal travel sensor, and travel sensor on a master brake cylinder.

6. The method according to claim 1, further comprising that the braking torque is built up when a braking request is received by a further control unit.

7. The method according to claim 6, wherein the further control unit receives the braking request via a vehicle data bus.

8. The method according to claim 6, wherein the further control unit communicates with at least one surroundings sensor.

9. The method according to claim 1, wherein the service brake system comprises hydraulic wheel brakes which are arranged in at least one brake circuit, further comprising that hydraulic pressure in at least one of the at least one brake circuit is measured and evaluated as a deceleration variable.

10. The method according to claim 9, wherein a motor-pump assembly is arranged in each of the at least one brake circuit for building up braking torque independently of a driver, the pump assembly having a pressure side configured to be put in fluid communication with at least one of the hydraulic wheel brakes and having a suction side configured to be put in fluid communication with a pressure medium reservoir, further comprising that the parking brake is activated when a deceleration request is received and a defect has been detected in at least one of the service brake system and the motor-pump assembly.

11. The method according to claim 1, further comprising a longitudinal acceleration sensor measuring a vehicle deceleration.

12. The method according to claim 1, further comprising that the slip variable is determined from a comparison of a vehicle speed with at least one wheel speed.

13. A vehicle brake system comprising:
a service brake system including a plurality of hydraulic wheel brakes,
at least one hydraulic motor-pump assembly configured to be connected to the wheel brakes for building up braking torque independently of a driver,
at least one parking brake associated with a wheel and configured to be activated by an electromechanical actuating unit independently of the service brake system,
at least one wheel rotational speed sensor arranged at a wheel associated with the service brake system and
an electronic control unit of the brake system, which receives information of the at least one wheel rotational speed sensor,
wherein the brake system is configured to carry out the steps of:
 a) receiving a deceleration request at the electronic control unit and, in response thereto, building up braking torque via the service brake system in accordance with the deceleration request and determining a deceleration target value,
 b) determining a deceleration variable of the vehicle,
 c) determining a slip variable of at least one wheel,
 d) comparing the determined deceleration variable with the deceleration target value,
 e) comparing the determined slip variable with a slip threshold value,
 f) determining that the deceleration variable is smaller than the deceleration target value, and
 g) in response to determining that the deceleration variable is smaller than the deceleration target value, activating the parking brake only when the slip variable is smaller than the slip threshold value.

* * * * *